(No Model.) 2 Sheets—Sheet 2.
C. A. SOUTHWICK.
BALANCE VALVE.

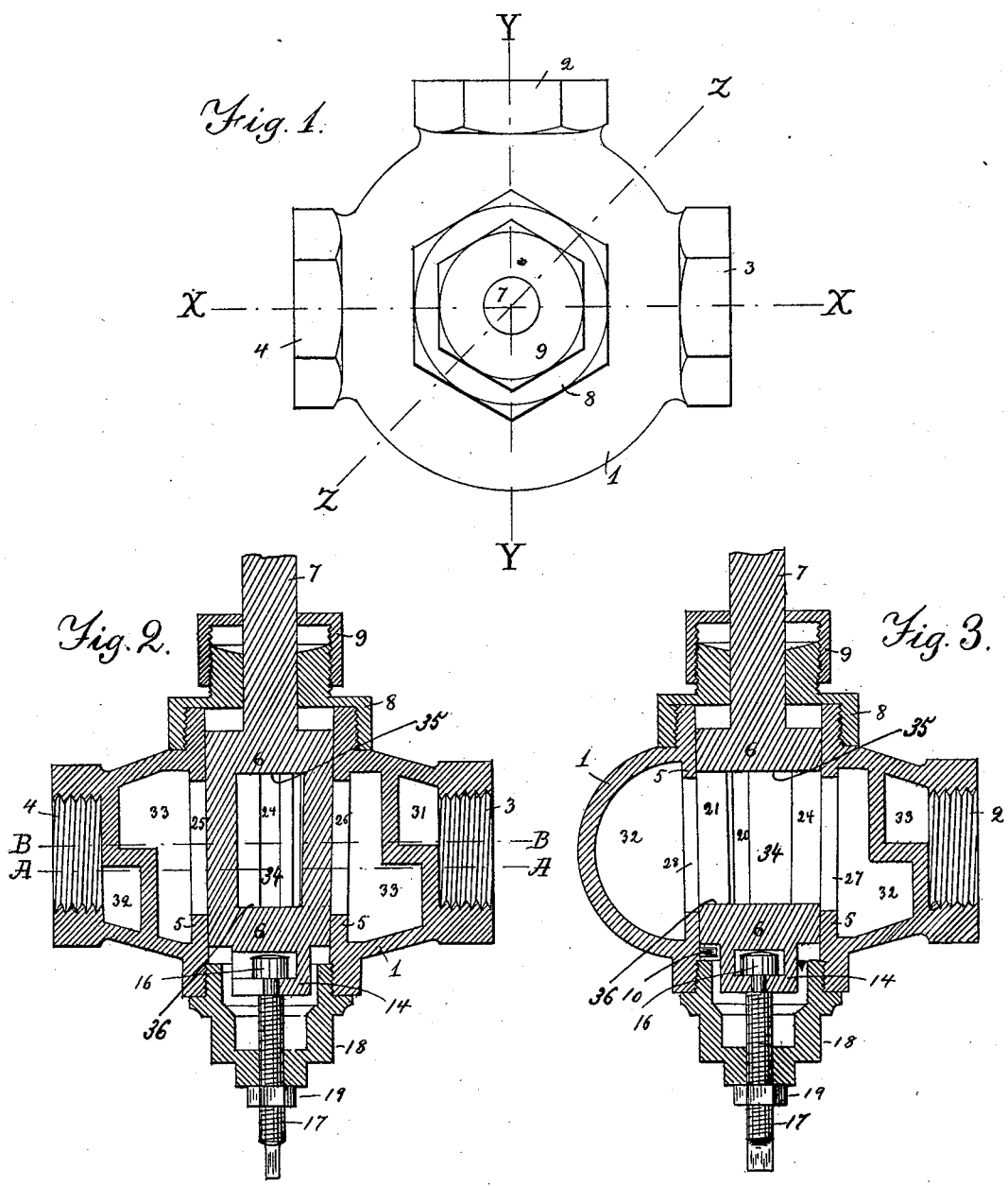

No. 406,116. Patented July 2, 1889.

Witnesses.
Carl A. Andrén
Selma R. Schelin

Inventor.
Charles A. Southwick
by Alban Andrén
his atty.

even on the different parts of the
UNITED STATES PATENT OFFICE.

CHARLES A. SOUTHWICK, OF PEABODY, MASSACHUSETTS.

BALANCE-VALVE.

SPECIFICATION forming part of Letters Patent No. 406,116, dated July 2, 1889.

Application filed November 3, 1888. Serial No. 289,860. (No model.)

*To all whom it may concern:*

Be it known that I, CHARLES A. SOUTH-WICK, a citizen of the United States, and a resident of Peabody, in the county of Essex and State of Massachusetts, have invented new and useful Improvements in Balance-Valves, of which the following, taken in connection with the accompanying drawings, is a specification.

This invention has for its object to provide a novel balance-valve for steam, gas, and other fluids, of the type wherein a rotary valve-plug having ports is located within a shell or casing having a series of branches or pipe-connections.

The invention consists in the novel features of construction and combination of devices hereinafter described and claimed, reference being made to the accompanying drawings, in which—

Figure 5:
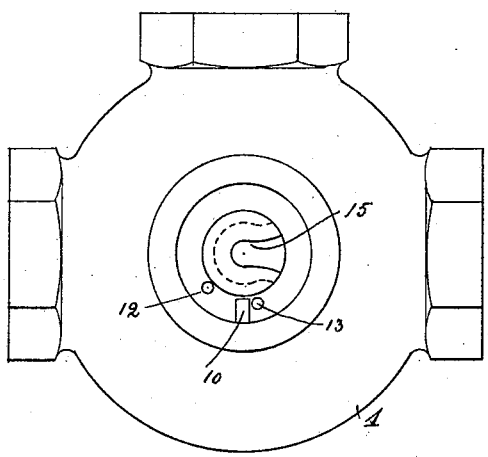
Figure 4:
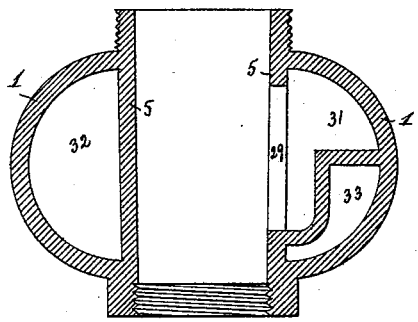
Figure 6:
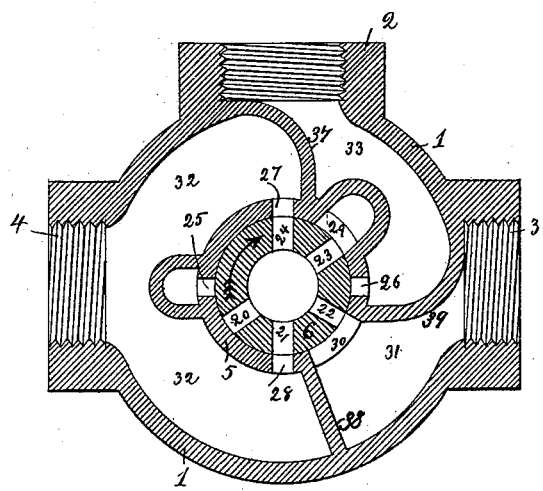
Figure 7:
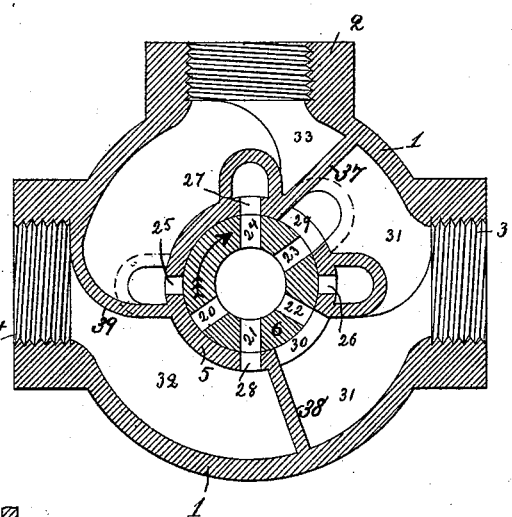
Figure 8:
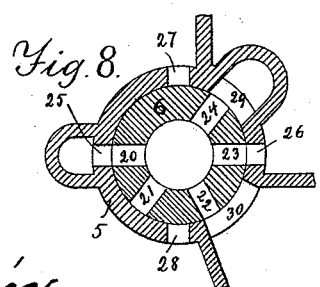

Figure 1 represents a plan view of the improved balance-valve. Fig. 2 represents a central longitudinal section on the line X X in Fig. 1. Fig. 3 represents a cross-section on the line Y Y in Fig. 1. Fig. 4 represents a cross-section of the valve-shell on the line Z Z in Fig. 1. Fig. 5 represents a bottom view of the balance-valve, showing the lower nut and screw-spindle as removed. Fig. 6 represents a horizontal section on the line A A in Fig. 2. Fig. 7 represents a similar section on the line B B in Fig. 2; and Fig. 8 represents a cross-section of the valve-plug and its ported annulus, showing the said plug in its reversed position.

Similar letters refer to similar parts wherever they occur on the different parts of the drawings.

1 is the valve shell or case, having branches 2, 3, and 4, preferably screw-threaded, as shown, for the purpose of connecting them to pipes for conveying the gas or liquid, in the desired manner.

In one piece with the shell 1 is cast the ported annulus 5, within which is arranged the rotary valve or plug 6, said annulus and its valve or plug being made slightly conical or tapering, for the purpose of establishing a proper fit between said parts and to take up any wear thereon, as is common in valves of this kind. The valve or plug 6 has an upwardly-projecting stem 7, to which a hand wheel or lever is to be secured for the operation of the said valve.

8 is a screw-cap, screwed to the upper portion of the shell or case 1, said cap having a central perforation for the stem 7 to pass through, as shown in Figs. 1, 2, and 3.

9 is a stuffing-gland screwed around the upper screw-threaded end of the cap, 8, and between the upper end of the latter and the gland 9 a suitable packing is to be located, so as to effect a steam-tight and water-tight connection at this place, as is common in valves or cocks.

10 is a stop projection secured to the lower end of the annulus or valve-seat 5, and to the lower end of the valve 6 are secured a pair of pins 12 and 13, (shown in Fig. 5,) by means of which the rotary motion of the valve within its seat is limited. The valve 6 is made vertically adjustable within its seat and held in its proper position relative to such valve-seat, with freedom of motion around its axis, by mechanism as follows: In one piece with the lower end of the valve 6 is made a hollow box 14, the bottom of which has a slot 15, extending from the center of said box to its periphery, as shown in Figs. 2 and 5. The said box is adapted to receive the head 16 of the regulating-screw 17, which latter is screwed through the lower end of a removable cap 18, that is screwed to the lower end of the valve-shell 1, as shown in Figs. 2 and 3.

19 is a check-nut on the lower end of the regulating-screw 17, which check-nut is to be screwed up against the lower end of the cap 18 after the plug 6 has been adjusted by means of the screw 17 to its proper position within the valve-seat 5. As the valve 6 or the interior of the valve-seat 5 wears, such wear can easily be taken up by means of the said regulating-screw 17.

The valve or plug 6 has ports 20 21 22 23 24, communicating with each other, as shown in Figs. 2, 3, 6, 7, and 8, and through the annulus or valve-seat 5 are made port perforations 25, 26, 27, 28, 29, and 30, as shown in said figures, for a purpose as will hereinafter be described. The ports 25 and 26 in the valve-seat 5 are arranged diametrically opposite each other, as are also the ports 27 and 28, as shown in Figs. 6, 7, and 8. In the plug 6 the ports 21 and 24 are arranged diametrically opposite each other, as are also the ports 20 and 23, as shown in said Figs. 6, 7, and 8. This arrangement of porting the said parts is for the purpose of equalizing the pressure and balancing the pressure of the gas or liquid passing through the ported valve-seat and its ported valve.

31 is a chamber within the shell 1, in open communication with the valve-seat ports 29 30 and the branch 3.

32 is a similar chamber within said shell 1, in open communication with the valve-seat ports 27 and 28 and the branch 4, and 33 is another similar chamber within said shell 1, in open communication with the valve-seat ports 25 and 26 and the branch 2, as shown in Figs. 2, 3, 4, 6, and 7.

The valve-seat ports 29 and 30 are preferably made wider than the corresponding ports in the plug or valve, as shown in Figs. 6, 7, and 8, so as to establish a communication between the chamber 31 and central part of the valve 6 during both of the various positions of said valve. (Shown, respectively, in Figs. 6 and 8.) If the plug 6 is in the position shown in Figs. 2, 3, 6, and 7, and steam, gas, or liquid under pressure is admitted at the branch 3, it will enter chamber 31 and pass into the valve or plug 6 through the valve-seat ports 29 30 and corresponding valve-ports 23 and 22. From the valve it will pass out through the diametrically-opposed valve-ports 21 24 and the corresponding valve-seat ports 28 27 and into the chamber 32, and finally out through the branch 4. During such position of the valve or plug 6 the valve-seat ports 25 26 are closed by the solid portions of the said valve, and consequently no communication is established between it and the branch 2. By turning the valve 6 within its seat in the direction of the arrow shown in Figs. 6 and 7 until the projection 12, in Fig. 5, comes in contact with the stationary stop projection 10, the said valve will be moved to the position shown in Fig. 8, causing a communication to be established between the interior of the valve and branch 3 by means of the valve-seat ports 29 30 and corresponding valve-ports 24 22, and causing the valve-ports 20 23 to come opposite to the respective valve-seat ports 25 26, by which a communication is established between the valve and the branch 2. During this position of the valve the valve-seat ports 27 28, leading to the branch 4, are closed by the solid portions of the plug or valve, as shown, covering the valve-seat ports 27 and 28. Thus by moving the valve to the position shown in Figs. 2, 3, 6, and 7 a communication is established between the branches 3 and 4, and by moving the valve to the position shown in Fig. 8 a communication is established between the branches 2 and 3.

The valve-plug 6 is hollow, as at 34, and both its upper and lower ends are closed or imperforate, as at 35 and 36, while the lateral ports through the side wall can be made to register, as hereinbefore explained, with the lateral ports in the annulus, in such manner that under all adjustments to open the valve the fluid entering the inlet branch 3 into the chamber 31 must pass laterally through the side walls of the annulus and valve-plug into and through the interior or hollow center of the latter, in order to gain access to either of the chambers 32 and 33.

The annulus 5 is a complete shell, circular in cross-section, located centrally in the valve-case 1, and the exterior of the side wall of the annulus is arranged at some distance from the side wall of the valve-case, to create the space required for the three chambers 31, 32, and 33. These chambers are formed by three diaphragms or partitions 37, 38, and 39, extending or radiating from the wall of the annulus to the wall of the valve-case, and said diaphragms or partitions permanently separate the three chambers, so that they have no communication except laterally through the annulus and the hollow center of the valve-plug, as before set forth. This construction is important, since to make a perfectly steam and gas tight valve the upper and lower ends of the valve-plug are imperforate, and the fluid from the inlet branch 3 necessarily passes through the hollow center of the valve-plug to gain access to both of the chambers 32 and 33. In these respects my valve differs in construction and mode of operation from the valve exhibited in Letters Patent No. 335,188, which is hereby disclaimed.

Having thus fully described the nature, construction, and operation of my invention, I wish to secure by Letters Patent, and claim—

1. The balance-valve herein described, consisting of the valve-case, having inlet and outlet branches 2, 3, and 4, a central annulus 5, provided with diametrically-opposed ports 25 26 and 27 28, the diaphragms or partitions 37 38 39, extending from the exterior of the annulus to the interior of the valve-case and forming three separate chambers 31, 32, and 33, intervening between said annulus and valve-case, and the rotary valve-plug 6, having imperforate upper and lower ends, a hollow center 34, and diametrically-opposed ports 20 23 and 21 24, all of which open into the hollow center of the valve-plug, substantially as described.

2. A balance-valve consisting of a valve-case having inlet and outlet branches, a central annulus, comprising a central cylindrical shell, separated from the interior of the case and having a series of lateral ports through its side wall, a series of diaphragms or partitions extending from the exterior surface of the annulus to the interior surface of the case and forming a series of separated chambers intervening between the annulus and case, and a rotary valve-plug having imperforate upper and lower ends, a hollow center, and a series of lateral ports opening through its side wall, and all of which open into the hollow center of the valve-plug, substantially as described.

In testimony whereof I have signed my name to this specification, in the presence of two subscribing witnesses, on this 27th day of October, A. D. 1888.

CHARLES A. SOUTHWICK.

Witnesses:
ALBAN ANDRÉN,
E. J. TORREY.